United States Patent
Anderson et al.

(10) Patent No.: US 7,680,412 B2
(45) Date of Patent: Mar. 16, 2010

(54) METHOD AND DEVICE FOR IN-BAND OPTICAL PERFORMANCE MONITORING

(75) Inventors: Trevor Anderson, Victoria (AU); Sarah Dods, Victoria (AU)

(73) Assignee: National ICT Australia Limited, Eveleigh, NSW (AU)

(*) Notice: Subject to any disclaimer, the term of this patent is extended or adjusted under 35 U.S.C. 154(b) by 0 days.

(21) Appl. No.: 11/912,659

(22) PCT Filed: Apr. 28, 2006

(86) PCT No.: PCT/AU2006/000560

§ 371 (c)(1),
(2), (4) Date: May 8, 2008

(87) PCT Pub. No.: WO2006/116802

PCT Pub. Date: Nov. 9, 2006

(65) Prior Publication Data

US 2008/0205886 A1    Aug. 28, 2008

(30) Foreign Application Priority Data

Apr. 29, 2005    (AU) ............................... 2005902178

(51) Int. Cl.
*H04B 10/08* (2006.01)
(52) U.S. Cl. .............................. 398/26; 398/25; 398/27; 398/33; 398/177; 398/38
(58) Field of Classification Search ................ 398/25, 398/26, 27, 33, 38, 152, 65, 34, 37, 158, 398/159, 147, 160, 148, 149, 202, 208, 209, 398/214, 94, 177
See application file for complete search history.

(56) References Cited

U.S. PATENT DOCUMENTS

| | | | |
|---|---|---|---|
| 3,435,229 | A | 3/1969 | Buhrer |
| 4,972,515 | A | 11/1990 | Shibutani |
| 6,396,051 | B1 | 5/2002 | Li et al. |
| 6,587,606 | B1 | 7/2003 | Evans |
| 6,847,440 | B2 | 1/2005 | Eberlein et al. |

(Continued)

FOREIGN PATENT DOCUMENTS

EP    1 376 899    1/2004

(Continued)

OTHER PUBLICATIONS

N. Hanik et al., "Application of Amplitude Histograms to Monitor Performance of Optical Channel",Electronic Letters, vol. 35, pp. 403-404, Mar. 1999.

(Continued)

*Primary Examiner*—Hanh Phan

(57) ABSTRACT

A method and device for determining in-band noise of an optical signal. The optical signal is split to produce two optical signal components, of distinct polarisation, such that the respective noise component in each signal component is uncorrelated. The optical signal components are converted to the electrical domain to produce electrical signal components. The signal component powers are equalised either in the optical domain or the electrical domain. The equalised electrical signal components are then subtracted together to cancel the correlated portions of the signal components (e.g. the data signal), such that only uncorrelated signal components (e.g. noise) are output for measurement.

24 Claims, 10 Drawing Sheets

U.S. PATENT DOCUMENTS

| | | | |
|---|---|---|---|
| 6,907,197 | B2 | 6/2005 | Heath et al. |
| 6,952,529 | B1 | 10/2005 | Mittal |
| 6,999,688 | B1 | 2/2006 | Hui et al. |
| 7,106,443 | B2 | 9/2006 | Wein et al. |
| 7,123,352 | B2 | 10/2006 | Han et al. |
| 7,130,505 | B2 | 10/2006 | Shen |
| 7,149,407 | B1 | 12/2006 | Doerr et al. |
| 7,149,428 | B2 * | 12/2006 | Chung et al. ............ 398/68 |
| 7,177,541 | B2 * | 2/2007 | Chung et al. ............ 398/26 |
| 7,477,852 | B2 * | 1/2009 | Agarwal et al. ......... 398/210 |
| 7,512,336 | B1 * | 3/2009 | Meli et al. .............. 398/17 |
| 2001/0052981 | A1 | 12/2001 | Chung et al. |
| 2002/0149814 | A1 | 10/2002 | Sorin |
| 2003/0090755 | A1 | 5/2003 | Chung et al. |
| 2004/0114923 | A1 | 6/2004 | Chung et al. |
| 2004/0126108 | A1 | 7/2004 | Chung et al. |
| 2004/0156632 | A1 | 8/2004 | Lee et al. |

FOREIGN PATENT DOCUMENTS

WO      WO 03/087741      10/2006

OTHER PUBLICATIONS

D.K. Jung et al., "OSNR Monitoring Technique Using Polarization-Nulling Method", IEEE Phot. Tech. Lett., vol. 13, pp. 88-90, Jan. 2001/Korea Advanced Institute of Science and Technology, Department of Engineering.

H. Sturat, "Signal-to-Noise Ratio Monitoring of Optical Data Using Narrowband RF Annalysis at the Half-Clock Frequency", OFC 2003, pp. 407-409.

C.J. Youn et al., "OSNR Monitoring Technique based on Orthogonal Delayed-Homodyne Method", IEEE Phot. Tech. Lett., vol. 14, pp. 1469-1471, Oct. 2002/Korea Advanced Institute of Science and Technology, Department of Engineering.

G.W. Lu et al., Simultaneous PMD and OSNR Monitoring by Enhanced RF Spectral Dip Analysis Assisted with Local Large-DGD Element, ECOC 04, 2 pages, Department of Information Engineering, The Chinese University of Hong Kong., 2005.

* cited by examiner

METHOD AND DEVICE FOR IN-BAND OPTICAL PERFORMANCE MONITORING

CROSS-REFERENCE TO RELATED APPLICATIONS

The present application claims priority from Australian Provisional Patent Application No 2005902178 filed on 29 Apr. 2005, the content of which is incorporated herein by reference.

TECHNICAL FIELD

The present invention relates to measurement of a signal to noise ratio in an optical network, and in particular relates to in-band measurement of the signal to noise ratio.

BACKGROUND ART

In order to monitor the performance of wavelength division multiplexed (WDM) optical networks it is useful to have a measurement of the signal to noise ratio (SNR) of each wavelength channel at various points throughout the network. In networks that are predominantly degraded by amplified spontaneous emission (ASE) noise the SNR is correlated with the optical signal to noise ratio (OSNR).

The OSNR has traditionally been measured with an optical spectrum analyser (OSA). The in-band OSNR can be estimated by interpolating ASE noise floor measured at points between adjacent wavelength channels. However, the OSA method fails for WDM systems with high spectral efficiency, as shown in FIG. 1, in which the optical spectrum of 10 GB/s NRZ signals with 50 GHz spacing (0.1 nm resolution) is illustrated. Notably, the modulation sidebands between such closely spaced channels mask the true OSNR level, and reduction of the resolution bandwidth of the OSA will be of no benefit. The OSA method also fails in reconfigurable networks where different channels may traverse through different optical paths.

There have been a number of alternative proposals to directly measure the in-band OSNR (i.e., the OSNR within the signal bandwidth), which attempt to overcome the above limitations. These in-band methods use a variety of techniques to distinguish the signal from the noise.

One such proposed method of in-band OSNR measurement is the asynchronous histogram technique set out in "*Application of Amplitude Histograms to Monitor Performance of Optical Channels*," Elec. Lett., vol 35, pp 403, March 1999. In this proposal, a high speed receiver is used to build up an asynchronously sampled histogram. While a simple concept, this method has difficulty in distinguishing various sources of noise impairment, and further requires a high speed detector.

A polarisation nulling method of in-band OSNR measurement is set out in J. H. Lee, D. K. Jung, C. H. Kim and Y. C. Chung, "*OSNR Monitoring Technique Using Polarisation-Nulling Method. IEEE Phot. Tech. Lett.*, vol. 13, pp 88-90, January 2001 and in United States Patent Application No. 2001/0052981. In this method the degree of polarisation of the channel is correlated with the OSNR. Using a quarter wave plate the signal is transformed into a linear state of polarisation and passed through a polariser. The OSNR is obtained from the ratio of the maximum and minimum average optical powers as the polariser is rotated.

A narrowband RF analysis at half-clock frequency is proposed in H. Stuart, "*Signal to Noise Ratio Monitoring of Optical Data Using Narrowband RF Analysis at the Half-Clock Frequency*," OFC 2003, pp 407-409. This technique is based on the assumption that the Fourier transform of a return to zero (RZ) electrical signal at half the clock rate is real. SNR is therefore said to be able to be determined from in-phase and quadrature measurements of electrical signal at half clock rate. This method is inherently narrowband and so requires minimal high speed electronics, and further is not limited to ASE noise. However, this method is dependent on signal format and bit rate, and can only measure RF noise at half bit rate for RZ signals. Further, this method assumes that noise measured at the half bit rate is indicative of noise across signal bandwidth, and assumes that noise sources are isotropic in phase space.

An orthogonal delayed homodyne technique is set out in C. J. Youn, K. J. Park, J. H. Lee and Y. C. Chung, "*OSNR Monitoring Technique Based on Orthogonal Delayed-Homodyne Method,*" IEEE Phot. Tech. Lett., vol. 14, pp 1469-1471, October 2002 and in United States Patent Application No. 2004/0126108 A1 The delayed homodyne technique relies on the perpendicular polarisation components of the ASE field being uncorrelated. FIG. 2 illustrates this principle of the delayed homodyne technique. The signal field is aligned at 45° to the axes of a polarisation beam splitter (PBS) so that the signal amplitudes in two axes are identical ($s_1(t)=s_2(t)$). In contrast, although the symmetric nature of the ASE noise ensures that there is equal noise power in both arms, the ASE amplitudes in the two arms of the PBS, $a_1(t)$ and $a_2(t)$, are uncorrelated.

A schematic of the experimental setup of the delayed homodyne technique for measuring in-band OSNR is shown in FIG. 3. The WDM channel is separated into the two arms of a polarisation beam splitter (PBS) with a delay of about 400 ps in one arm and then recombined with a second PBS. The module within the dashed square is thus simply a first order PMD emulator. The RF spectrum of the signal output has a null at a frequency determined by the time delay ($f_{null}=\frac{1}{2}\Delta\tau$). In contrast, the ASE noise spectrum is not affected by the delay since the ASE fields in the different arms of the PBS are uncorrelated. A measure of the radio frequency (RF) spectral power at the null thus gives a direct measure of the ASE noise. The delayed homodyne technique works with depolarized or circularly polarised light, the depth of the null is insensitive to first order polarisation mode dispersion (PMD) and the frequency of the null is dependent on differential group delay (DGD). The delayed homodyne technique requires equal powers in both arms of the PBS, necessitating a polarisation controller (PC) at the PBS input to compensate for fluctuations in the input state of polarisation. Further, for a fixed time delay, the null only exists at one frequency, and measurement of the OSNR can only occur at that frequency.

A RF spectral null analysis technique with polarisation maintaining (PM) fiber has been proposed in G. W. Lu, M. H. Cheung, L. K. Chen and C. K. Chan, "*Simultaneous PMD and OSNR Monitoring by Enhanced RF Spectral Dip Analysis Assisted with a Local Large-DGD Element,*" ECOC 04, such technique being based on a similar principle to Balanced Homodyne technique. However in this case, the relative delay in the polarisation states is obtained by introducing a polarisation maintaining (PM) fiber with a large DGD in place of the PMD emulator.

United States Patent Application No. 2002/0149814 discloses a multi-function optical performance monitor. This document is based on a 4 port PBS with the outputs incident upon two photo detectors [6]. The input of the PBS consists of the signal port and a local oscillator (mixing port). The monitor is designed to measure signal impairments such as PMD and dispersion.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect, the present invention provides a method of determining in-band noise of an optical signal, the method comprising:

splitting the optical signal to produce a first optical signal component and a second optical signal component of distinct polarisation to the first optical signal component;

converting the first optical signal component to the electrical domain to produce a first electrical signal component;

converting the second optical signal component to the electrical domain to produce a second electrical signal component;

equalising a signal power of the first electrical signal component and a signal power of the second electrical signal component; and subtracting the equalised first electrical signal component and second electrical signal component.

According to a second aspect the present invention provides a device for determining in-band noise of an optical signal, the device comprising:

a polarisation beam splitter for splitting the optical signal to produce a first optical signal component and a second optical signal component of distinct polarisation to the first optical signal component;

a first photodetector for converting the first optical signal component to the electrical domain to produce a first electrical signal component;

a second photodetector for converting the second optical signal component to the electrical domain to produce a second electrical signal component;

means for equalising a signal power of the first electrical signal component and a signal power of the second electrical signal component; and a combiner for subtracting the equalised first electrical signal component and second electrical signal component.

The polarisation of the second optical signal component must be sufficiently distinct from the polarisation of the first optical signal component that the noise to be measured in the second optical signal component is no more than partially correlated, and preferably is uncorrelated, with the noise in the first optical signal component. By ensuring that the respective distinctly polarised noise components are thus partially or wholly uncorrelated, subtraction of the equalised first and second electrical signal components will not cause subtractive cancelling of the partially or wholly uncorrelated noise components. However, subtraction of the equalised first and second electrical signal components will lead to substantial cancellation of the signal by subtraction, such that the output of the subtractive combination of the first and second electrical signal components provides a measurable noise component. The present invention thus relies on the noise being at least partially if not substantially wholly statistically independent at the distinct polarisations.

By performing subtraction of two polarised components of the optical signal, the present invention provides for in-band cancellation of correlated signals such as data signals, without cancelling uncorrelated signals such as ASE noise. Thus, where the correlated signals have been cancelled, direct in-band measurement of the remaining uncorrelated signals such as ASE noise may take place.

Further, by separately converting the first and second optical signal components into the electrical domain, the present invention enables greater application of electrical signal processing techniques. Exploitation of such electrical signal processing techniques can reduce the performance requirements on devices used to process the optical signal components, thus allowing prospective implementation with low cost optical components. For example, no polarisation control is required in some embodiments of the invention.

In some embodiments of the invention the electrical bandwidth of the photodetectors may be substantially less than the signal bandwidth. Since the ASE beat noise is approximately constant across the spectrum, the low frequency components can be used to determine the OSNR. If both receivers have identical response functions the distorted signals induced by the low bandwidth filtering will be common to both channels and can therefore be cancelled. As well as reducing the cost, the low speed embodiment is less sensitive to timing offsets and to $1^{st}$ order PMD.

In some embodiments of the invention the output from each photodetector may be passed through a variable bandpass filter. The combination of the photodetector and filter thus form an optical receiver, the electric bandwidth of which is variable.

Equalising of the signal power of the first electrical signal component and the signal power of the second electrical signal component may be achieved using one or more of a number of techniques. For example, in some embodiments of the invention one or both of the first optical signal component and the second optical signal component may be passed through a variable optical attenuator prior to conversion to the electrical domain. In such embodiments the one or more variable optical attenuators are preferably controlled by feedback from the electrical domain. That is, a signal power of the first and second electrical signal components may be determined in the electrical domain in order to provide feedback control of the one or more variable optical attenuators.

In further embodiments, equalising of the signal power of the first electrical signal component and the signal power of the second electrical signal component may additionally or alternatively comprise passing the optical signal through a polarisation controller configured at substantially 45° to the input of the polarisation beam splitter such that, upon splitting, substantially equal signal power is carried by the first optical signal component and the second optical signal component.

In further embodiments of the invention, equalising of the signal power of the first electrical signal component and the signal power of the second electrical signal component may comprise monitoring the signal power of the first and second electrical signal components, and by waiting for polarisation changes in the optical signal to cause equalisation from time to time. In some such embodiments, the optical signal may be passed through a rotating quarter wave plate prior to splitting in order to increase the regularity with which polarisation changes cause equalisation.

In some embodiments of the invention, equalising of the signal power of the first electrical signal component and the signal power of the second electrical signal component may additionally or alternatively comprise digital or analogue processing of the first electrical signal component and/or the second electrical signal component, prior to subtraction of the first electrical signal component and the second electrical signal component.

In still further embodiments of the present invention, equalising of the signal power of the first electrical signal component and the signal power of the second electrical signal component may additionally or alternatively comprise:

splitting the second optical signal component to obtain a third optical signal component and a fourth optical signal component having a polarisation at substantially 45 degrees to the third optical signal component;

converting the third optical signal component to the electrical domain to obtain a third electrical signal component;

converting the fourth optical signal component to the electrical domain to obtain a fourth electrical signal component; and selecting one of the third electrical signal component and the fourth electrical signal component to serve as the second electrical signal component for subtraction with the first electrical signal component.

Such embodiments thus enable a selection to be made as to which of the third electrical signal component and the fourth electrical signal component carries the most similar signal power to the first electrical signal component. Such embodiments may be particularly applicable where polarisation control is not applied prior to splitting of the optical signal.

In still further embodiments of the invention, equalising of the signal power of the first electrical signal component and the signal power of the second electrical signal component may additionally or alternatively comprise depolarising the optical signal prior to splitting the optical signal. Such embodiments ensure that a substantially equal signal noise power will be present in each of the first optical signal component and the second optical signal component and that, upon conversion to the electrical domain with substantially matched photodetectors, a substantially equal signal noise power will be present in the first electrical signal component and the second electrical signal component.

Preferably, the first optical signal component and the second optical signal component undergo substantially equal delay prior to conversion to the electrical domain, such that the output of the subtractive combination of the first electrical signal and the second electrical signal is substantially noise only across the whole band. For example, upon splitting, the first optical signal component and the second optical signal component may each be passed directly to respective photodetectors for conversion to the electrical domain, thus ensuring equal delay. Such embodiments are particularly advantageous as noise may be directly measured in-band and across the entire band of interest.

Alternatively, the first optical signal component and the second optical signal component may undergo distinct delays, such that the output of the subtractive combination of the first electrical signal and the second electrical signal is substantially noise only at particular frequencies defined by the delay difference.

In some embodiments of the invention the device may further enable measurement of the average optical signal power. The device may comprise a tap coupler to tap a further optical signal component and a photodetector to convert the signal component to the electrical domain. The electrical signal output from the photodetector may then be passed to the combiner for processing.

BRIEF DESCRIPTION OF THE DRAWINGS

By way of example only, preferred embodiments of the invention will be described with reference to the accompanying drawings, in which.

DETAILED DESCRIPTION OF THE INVENTION

Figure 1:
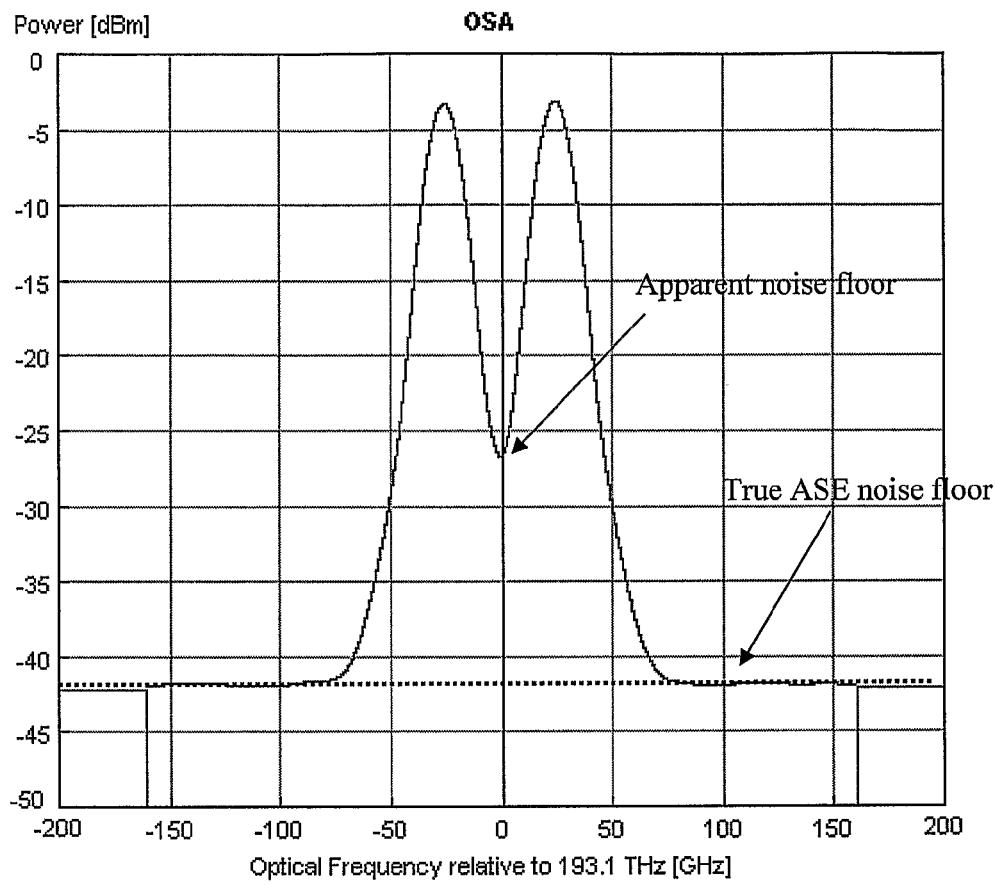
FIG. 1 is a plot of an optical spectrum of 10 GB/s NRZ signals with 50 GHz spacing (0.1 nm resolution), illustrating overlapping modulation sidebands.
Figure 2:
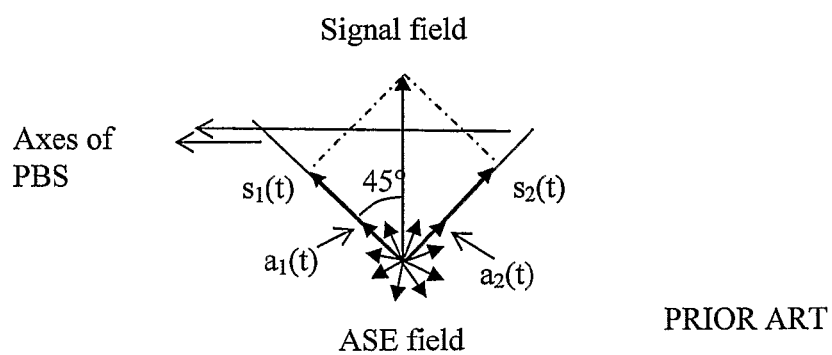
FIG. 2 is a polarisation diagram illustrating the principle of the prior art delayed homodyne technique.
Figure 3:
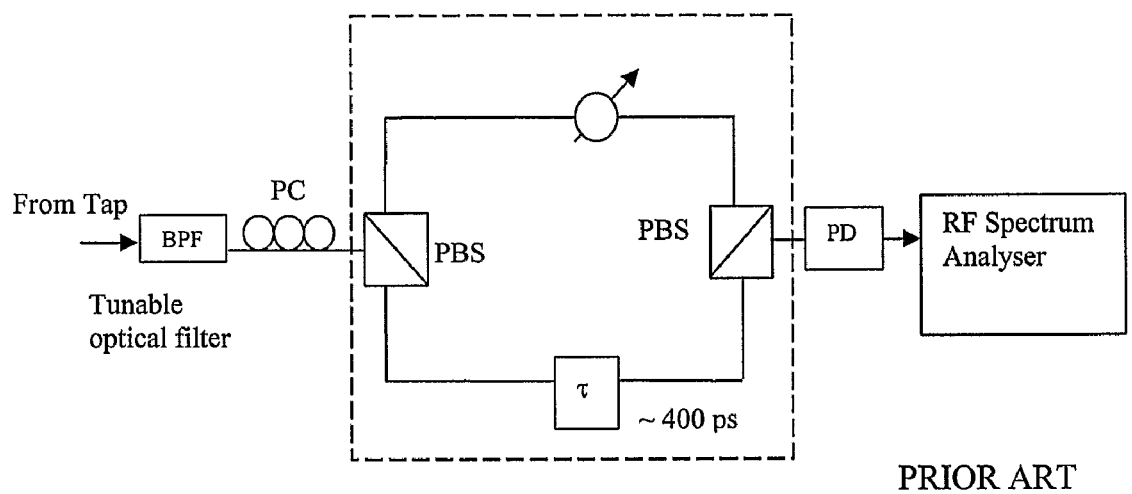
FIG. 3 is a schematic of the experimental setup of the prior art delayed homodyne technique for measuring in-band OSNR.
Figure 4:
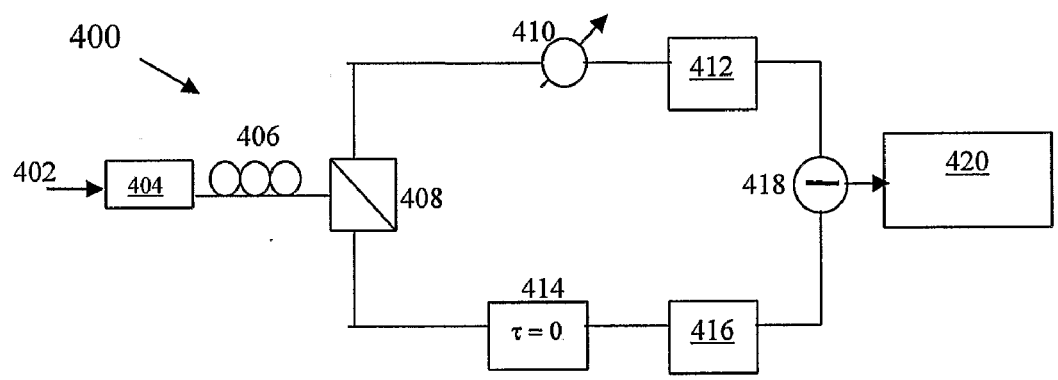
FIG. 4 is a schematic of an OSNR monitoring device in accordance with a first embodiment of the present invention.

FIG. 4 is a schematic of an OSNR monitoring device 400 in accordance with a first embodiment of the present invention. An input optical signal 402 is tapped from a WDM optical network being monitored. The input optical signal 402 is first passed through a tunable optical bandpass filter 404 to ensure only a band of interest is processed. From filter 404, the optical signal is passed through a polarisation controller 406 to orient the polarised data signal at 45 degrees to the input of a polarisation beam splitter 408. Polarisation beam splitter 408 splits the optical signal to produce a first optical signal component and a second optical signal component, which will each carry a substantially equal signal power due to the 45 degree polarisation applied by polarisation controller 406.

The first optical signal component is passed through a variable optical attenuator 410, and then converted to the electrical domain by photodetector 412 to produce a first electrical signal component. The second optical signal component is passed through a time delay 414, set to zero in the present embodiment, and then converted to the electrical domain by photodetector 416 to produce a second electrical signal component. The first electrical signal component and the second electrical signal component are combined by subtraction 418, the output of which is then analysed by a RF spectrum analyser 420.

The present embodiment of the invention relies on the perpendicular components of the ASE noise fields being substantially statistically independent. Thus, when the output of the polarisation controller 406 is such that there is equal signal power in the first optical signal component and the second optical signal component, and when variable time delay 414 is set to zero such that there is no time delay between the arms, the signal is cancelled across its entire bandwidth upon subtraction in the electrical domain at 418. In contrast, the independence of the ASE noise in the two photodetectors 412 and 416 results in the addition of the noise power at 418. The RF spectrum of the ASE noise can therefore be measured across the entire signal bandwidth.

Importantly, in the present embodiment of the invention, the first optical signal component and the second optical signal component are separately detected, and are then combined (subtracted) in the electrical domain. This allows ASE noise to be measured across the entire signal bandwidth without the need to introduce variable time delays, and further enables the use of signal processing to cost effectively mitigate the effects of fluctuations of the input state of polarisation.

In the embodiment shown in FIG. 4, photodetector 412, photodetector 416, subtraction 418 and RF analyser 420 are separate components. Such a use of individual detectors enables access to the individual photocurrents. Thus, compensation of unbalanced optical powers induced by polarisation fluctuations could be carried out in the electrical domain prior to subtraction 418.

In alternative embodiments photodetectors 412 and 416 may be implemented by a balanced receiver which is an integrated device essentially consisting of back to back detectors and an amplifier. Such an integrated device has the advantage that the photodetectors are well matched, however such an integrated device may be expensive.

Figure 5:
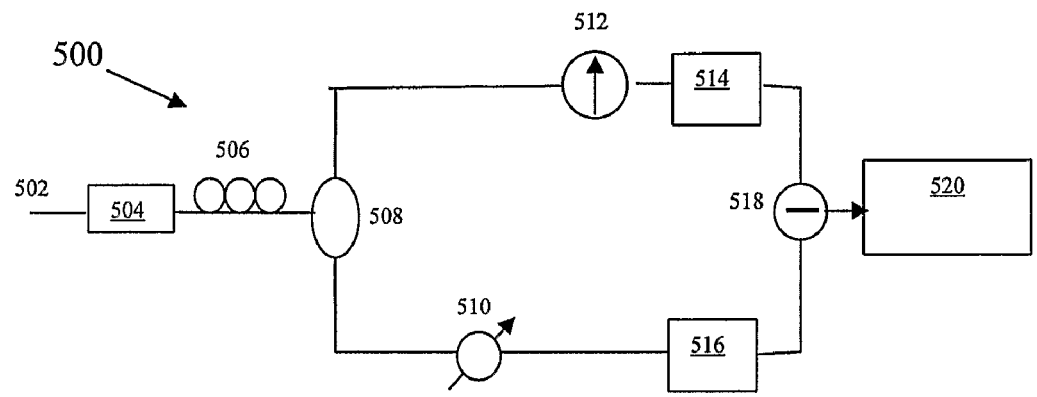
FIG. 5 is a schematic of an OSNR monitoring device in accordance with a second embodiment of the present invention.

In embodiments of the invention in which cost reduction in respect of the polarisation beam splitter is sought, a low cost polarisation beam splitter with poor extinction ratio (perhaps as low as 3 dB) could be used. Alternatively, FIG. 5 illustrates an OSNR monitoring device 500 in accordance with a second embodiment of the present invention, in which the polarisation beam splitter is replaced with a 3 dB coupler, one arm of which is polarised. In considering FIG. 5 in more detail, an input optical signal 502 is tapped from a WDM optical network being monitored. The input optical signal 502 is first passed through a tunable optical bandpass filter 504 to ensure only a band of interest is processed. From filter 504, the optical signal is passed through a polarisation controller 506 to orient the polarised data signal at substantially 45 degrees to the axis of a polariser 512. Power splitter 508 splits the optical signal to produce a first optical signal component and a second optical signal component, which will each carry a substantially equal signal power.

The first optical signal component is then passed through a polariser 512 to provide the first optical signal component with a polarisation which is distinct from the polarisation of the second optical signal component. The polarised first optical signal component is then converted to the electrical domain by photodetector 514 to produce a first electrical signal component. The second optical signal component is passed through a variable optical attenuator 510 and then to photodetector 516 to be converted to the electrical domain to produce a second electrical signal component. The first electrical signal component and the second electrical signal component are combined by subtraction 518, the output of which is then analysed by a RF spectrum analyser 520. Once again, due to the distinct polarisation state of the first optical signal component and the second optical signal component at the time of conversion to the electrical domain, correlated components such as data signals will be cancelled by subtraction 518, whereas uncorrelated noise components will be additive at the output of subtraction 518, and thus noise components may be directly measured by RF spectrum analyser 520. Further, use of the power splitter 508 rather than a polarisation beam splitter in the embodiment of FIG. 5 provides for a low cost OSNR monitoring device in accordance with the present invention.

A further refinement which may be made to some embodiments of the invention, including to the embodiments shown in FIGS. 4 and 5, is the addition of a non-zero time delay to one arm of the device, either in the electrical or optical domain. In such embodiments of the invention, nulls will occur at periodic frequencies defined by the delay. This feature may be usefully applied to measuring first order polarisation mode dispersion.

Figure 6:
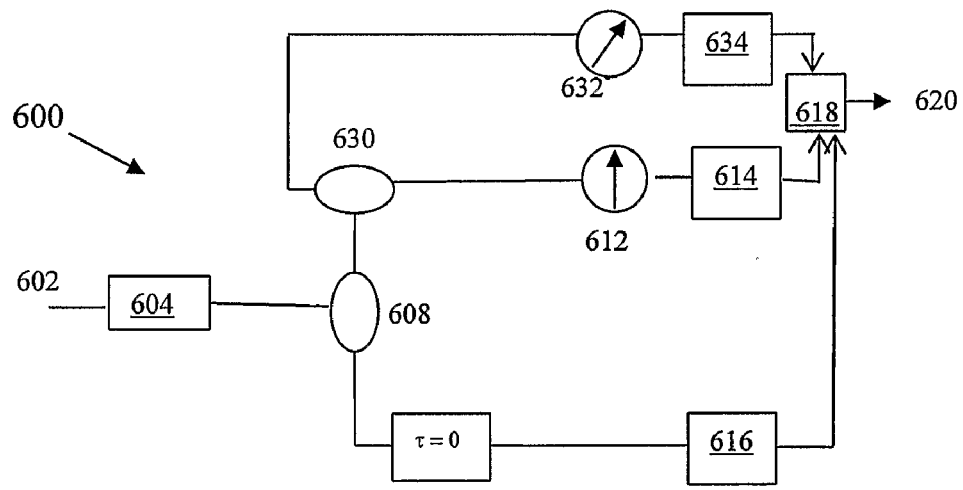
FIG. 6 is a schematic of an OSNR monitoring device in accordance with a third embodiment of the present invention.

It is noted that without polarisation controllers 406, 506 in FIGS. 4 and 5, signal cancellation and noise extraction could not occur at 418, 518 when the polarisation of the input signal 402, 502 is aligned with that of the PBS 408 or polariser 512. FIG. 6 is a schematic of an OSNR monitoring device 600 in accordance with a third embodiment of the invention, which builds on the OSNR monitoring device of FIG. 5 by inclusion of a second polariser 632 at substantially 45° to the first polariser 612 to ensure that OSNR can be measured for all input polarisation states, without requiring a polarisation controller at the input. An input optical signal 602 is tapped from a WDM optical network being monitored. The input optical signal 602 is first passed through a tunable optical bandpass filter 604 to ensure only a band of interest is processed. From filter 604, the optical signal is passed to the input of a simple power splitter 608. Power splitter 608 splits the optical signal to produce a first optical signal component and a second optical signal component.

The first optical signal component is then passed to a second power splitter 630 to produce a third optical signal component and a fourth optical signal component. The third optical signal component is passed through a polariser 612 to provide the third optical signal component with a polarisation which is distinct from the polarisation of the second optical signal component. The polarised third optical signal component is then converted to the electrical domain by photodetector 614 to produce a third electrical signal component. The fourth optical signal component is passed through a polariser 632, polarised at substantially 45 degrees to polariser 612, to provide the fourth optical signal component with a polarisation which is at 45 degrees from the polarisation of the third optical signal component, and which is distinct from the polarisation of the second optical signal component. The polarised fourth optical signal component is then converted to the electrical domain by photodetector 634 to produce a fourth electrical signal component.

The second optical signal component is passed from power splitter 608 via a zero time delay to photodetector 616 to be converted to the electrical domain to produce a second electrical signal component. The second, third and fourth electrical signal components are passed to digital signal processor 618. By ensuring a 45 degree difference in polarisation of the third and fourth optical signal components, the device 600 of FIG. 6 ensures that, regardless of input polarisation state, and without the need for an input polarisation controller, sufficient information is provided to the DSP 618 to enable processing such that correlated components such as data signals are cancelled and the RF noise spectrum and OSNR can be determined. Effectively, one or both of the third electrical signal component and fourth electrical signal component are selected to serve as the 'first electrical signal component'. Thus, in the device 600, polarisation compensation is performed totally within the signal processing module 618.

Figure 7:
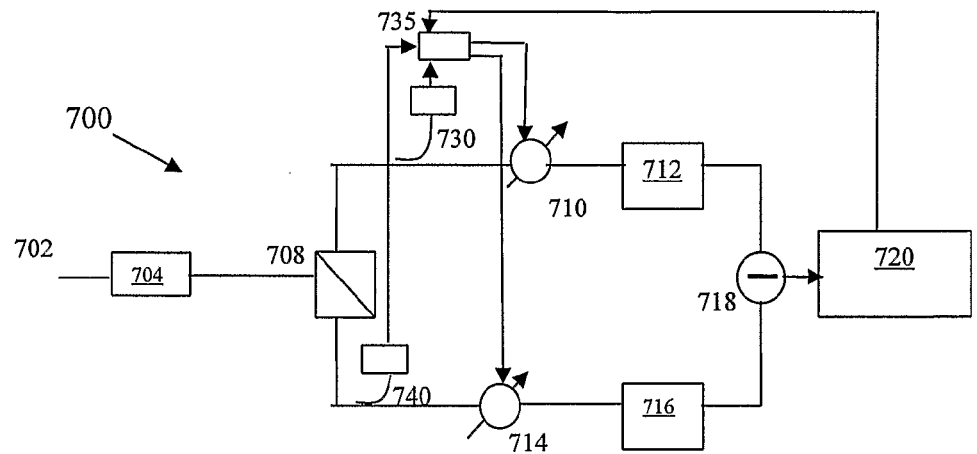
FIG. 7 is a schematic of an OSNR monitoring device in accordance with a fourth embodiment of the present invention.

FIG. 7 is a schematic of an OSNR monitoring device 700 in accordance with a fourth embodiment of the invention, in which compensation for input polarisation fluctuations is addressed by active attenuation of the signal powers in the two arms of the receiver, in the optical domain. In more detail, an input optical signal 702 is tapped from a WDM optical network being monitored. The input optical signal 702 is first passed through a tunable optical bandpass filter 704 to ensure only a band of interest is processed. From filter 704, the optical signal is passed to the input of a polarisation beam splitter 708. Polarisation beam splitter 708 splits the optical signal to produce a first optical signal component and a second optical signal component, which will each carry a variable level of signal power due to input polarisation fluctuations.

The first optical signal component is passed through a variable optical attenuator 710, and then converted to the electrical domain by photodetector 712 to produce a first electrical signal component. The second optical signal component is passed through a variable optical attenuator 714, and then converted to the electrical domain by photodetector 716 to produce a second electrical signal component. The first electrical signal component and the second electrical signal component are combined by subtraction 718, the output of which is then analysed by a RF spectrum analyser 720.

To equalise the signal power of the first and second electrical signal components, variable optical attenuators 710 and 714 respectively apply variable gain to the first and second optical signal components. The gain to be applied by each of the variable optical attenuators 710 and 714 is controlled by the output of monitor taps 730 and 740 each comprising a low bandwidth photodetector. The output of monitor taps 730 and 740, together with feedback information from RF analyser 720, is passed to a controller 735, which assesses the relative signal power present in each of the first and second optical signal components and controls the gain of each of the variable optical attenuators 710 and 714 accordingly. Thus the device 700 of the fourth embodiment provides for substantially equal signal power in each of the first and second optical signal components, leading to substantially equal signal power in the first and second electrical signal components. Such a system assumes that input polarisation state fluctuations are at frequencies within the bandwidth of the variable optical attenuators 710 and 714 (typically <10 kHz).

In further embodiments of the invention, polarisation scrambling/control schemes could additionally or alternatively include: scrambling in the time domain and measurement of minimum RF power; a feedback scheme to the polarisation controller e.g. 406, 506) to ensure an RF minimum is produced by subtraction; and spectral depolarisation, for example use of a passive device to depolarise the input, with 100% depolarisation ensuring equal signal power in each of the first and second optical signal components.

An alternative to polarisation control is to compensate for input polarisation fluctuations by actively attenuating the respective signal powers in each arm of the device. Such attenuation can be achieved in the optical domain, as in the embodiment of FIG. 7, or in the electrical domain, as in the embodiment of FIG. 6. Digital domain processing can be achieved by digital signal processing, whereby the output from the two receivers is amplified and digitally sampled and processed. The signal processing module (for example including the DSP 618 of FIG. 6) compensates for the polarisation fluctuations, subtracts the signal components and determines the ASE noise power. Alternatively such processing may be performed in the electrical domain by analogue processing, whereby amplifiers with gain control are used to equalise signal powers prior to subtraction.

Such compensation techniques may be less effective when the polarisation state of the signal coincides with (or is close to) that of the beam splitter or polariser. In general this is an unlikely event (typical input states are elliptical with some degree of depolarization) and a simple approach is to ignore these times and wait until the polarisation drifts away from such states. Alternatively, embodiments such as that shown in FIG. 6 can ensure that there is always sufficient information to perform the signal subtraction by including a second PBS or polariser orientated at 45° to the first.

In further embodiments of the invention, a combination of active attenuation and polarisation control could be applied. For example, a quarter wave plate rotating at a fixed rate may act upon the input optical signal, use of which could be combined with active attenuation. This would ensure that the system does not sit in an unfavourable polarisation state for long lengths of time. In general, gain/attenuation control can be used to ease the requirements on polarisation control.

In the above embodiments, the input optical signal is first passed through a tunable optical bandpass filter to ensure only a band of interest is processed. However it should be appreciated in any of the embodiments the optical bandpass filter can have a variable bandwidth.

Figure 8:
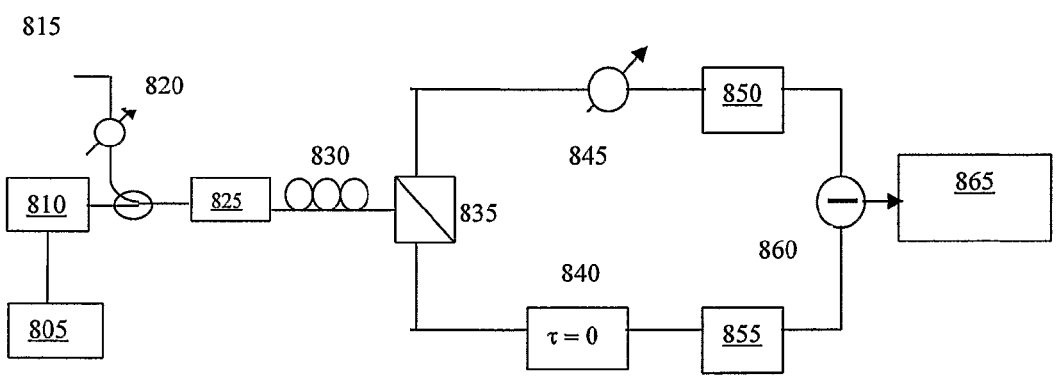
FIG. 8 is a schematic of an experimental setup to demonstrate the invention.

The principle of the present invention has been demonstrated with a 10 Gb/s NRZ system, as shown in FIG. 8. The signal was generated with a 1510 nm source 805 externally modulated with a Mach-Zehnder-Interferometer (MZI) 810 and $2^{31}-1$ 10 Gb/s pseudo random bit sequence (PRBS) generator. OSNR was varied by combining the signal with an ASE noise source 815 attenuated at 820 to differing powers. The signal was filtered with a 200 GHz optical bandpass filter 825 and then sent through a polarisation controller 830 and through to the input of a polarisation beam splitter 835. Sensitivity to time delay was tested by inserting a variable optical delay line 840 into one arm of the PBS 835. The polarisation controller 830 was manually adjusted to ensure equal power in both arms of the receiver. An optical attenuator 845 was also used in one arm of the PBS to compensate for loss in the optical delay line 840.

The two outputs of the PBS 835 were sent to a balanced detector 850, 855, 860 (bandwidth 10 GHz) and then to an RF spectrum analyser 865. For this experiment no RF amplifier was used.

Figure 9:
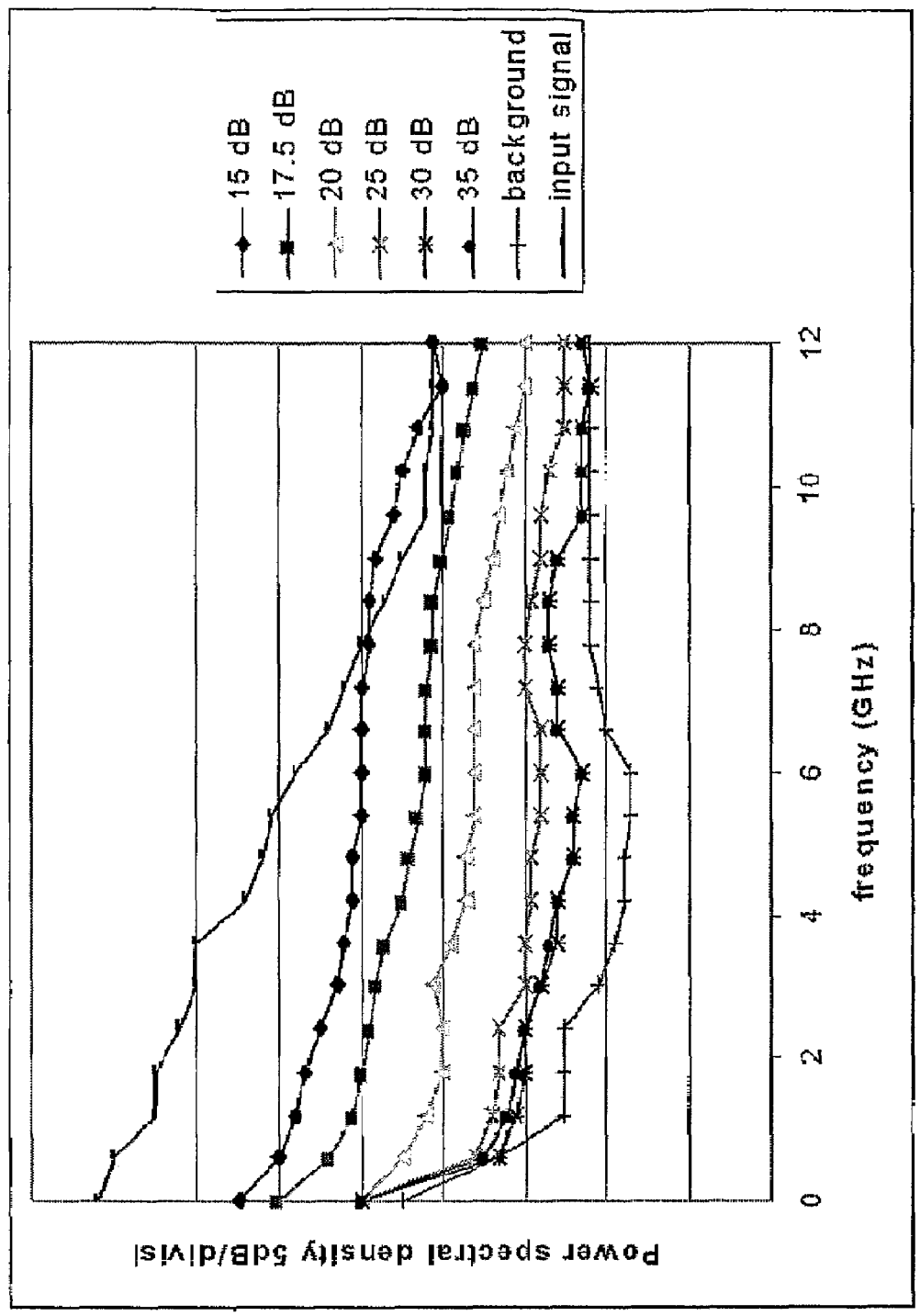
FIG. 9 is a chart of RF spectrum measurements obtained for a range of input OSNR levels using the experimental setup of FIG. 8.
Figure 10:
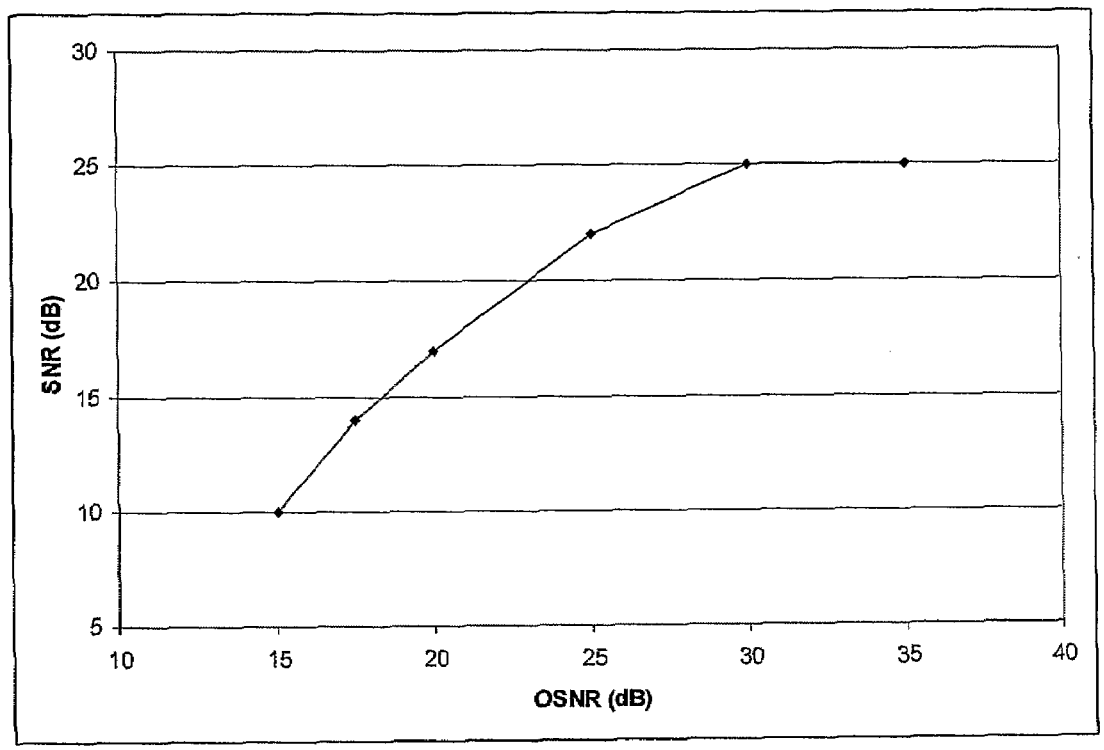
FIG. 10 is a chart of SNR measurements obtained for a range of input OSNR levels using the experimental setup of FIG. 8.

FIG. 9 shows measured RF spectrum for various level of OSNR. FIG. 10 illustrates a calibration curve for an In Band OSNR monitor and shows measured SNR for various level of OSNR. The departure from linearity in FIG. 10 is due to spontaneous-spontaneous noise at low OSNR and thermal receiver noise at high OSNR.

Figure 11:
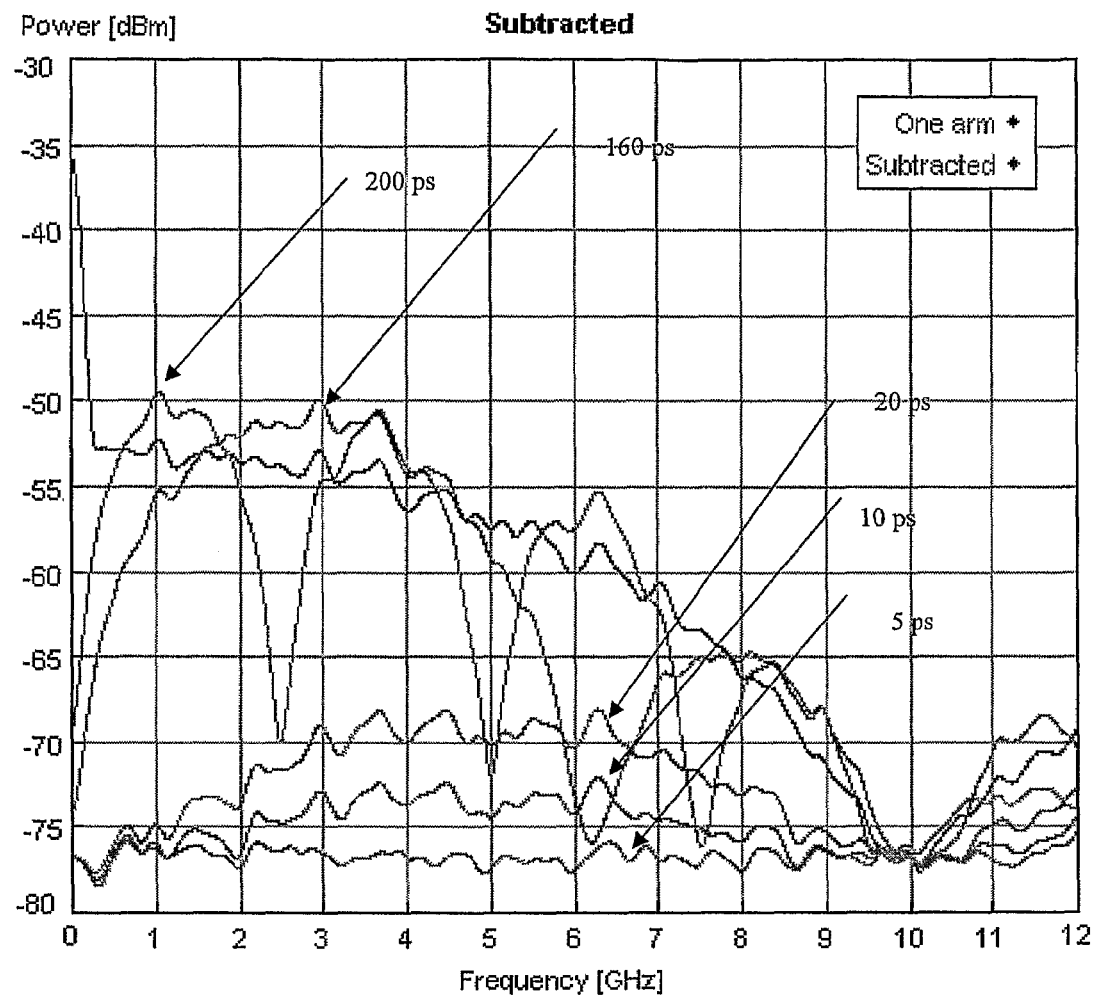
FIG. 11 is a chart of simulations of the RF spectrum as a function of time delay between the arms of the PBS of the experimental setup of FIG. 8.

Sensitivity to differential group delay (DGD) was tested by varying the time delay in one arm of the PBS. Simulation results shown in FIG. 11 suggest that low frequency RF noise (<1 GHz) is insensitive to realistic levels of DGD.

Figure 12:
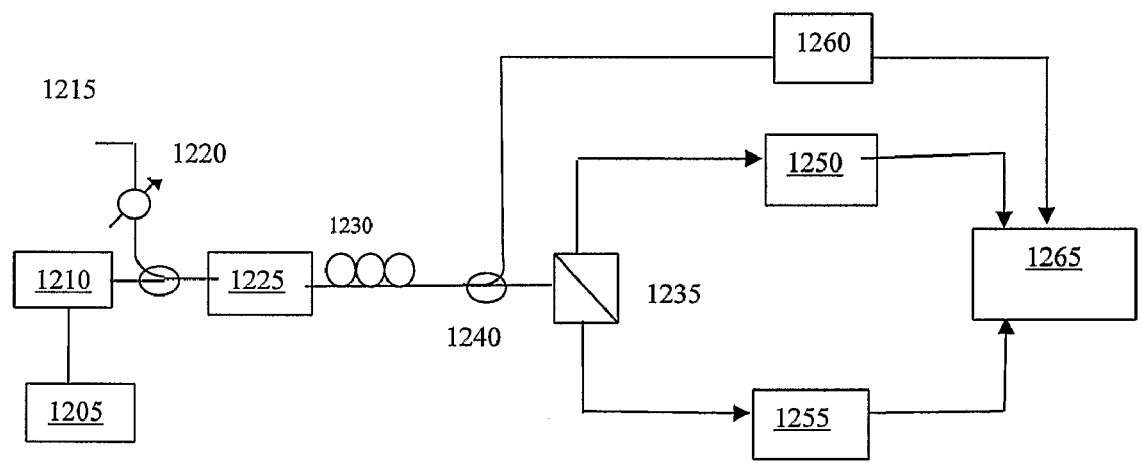
FIG. 12 is schematic of an experimental setup to demonstrate an embodiment of the invention encompassing low bandwidth receiver and digital signal processing.

A low bandwidth implementation of the monitor has been demonstrated with a 10 Gb/s NRZ system as illustrated in FIG. 12. In this example, the signal was generated with a 1510 nm source 1205 externally modulated with a Mach-Zehnder-Interferometer (MZI) 1210 and $2^{31}-1$ 10 Gb/s pseudo random bit sequence (PRBS) generator. OSNR was varied by combining the signal with an ASE noise source 1215 attenuated at 1220 to differing powers. The signal was filtered with a 200 GHz optical bandpass filter 1225 and then sent through a polarisation controller 1230 and through to the input of a polarisation beam splitter 1235. The average optical signal power is determined with a tap 1240 and a DC coupled receiver 1260. The electrical output of the receiver 1260 is sampled by the DSP module 1265. The two outputs of the polarisation beam splitter were sent to low speed receivers 1250, 1255 (bandwidth 110 MHz), where the respective optical signals were converted to the electrical domain and then to a DSP module 1265 which digitally samples the signals and calculates the OSNR.

Figure 13:
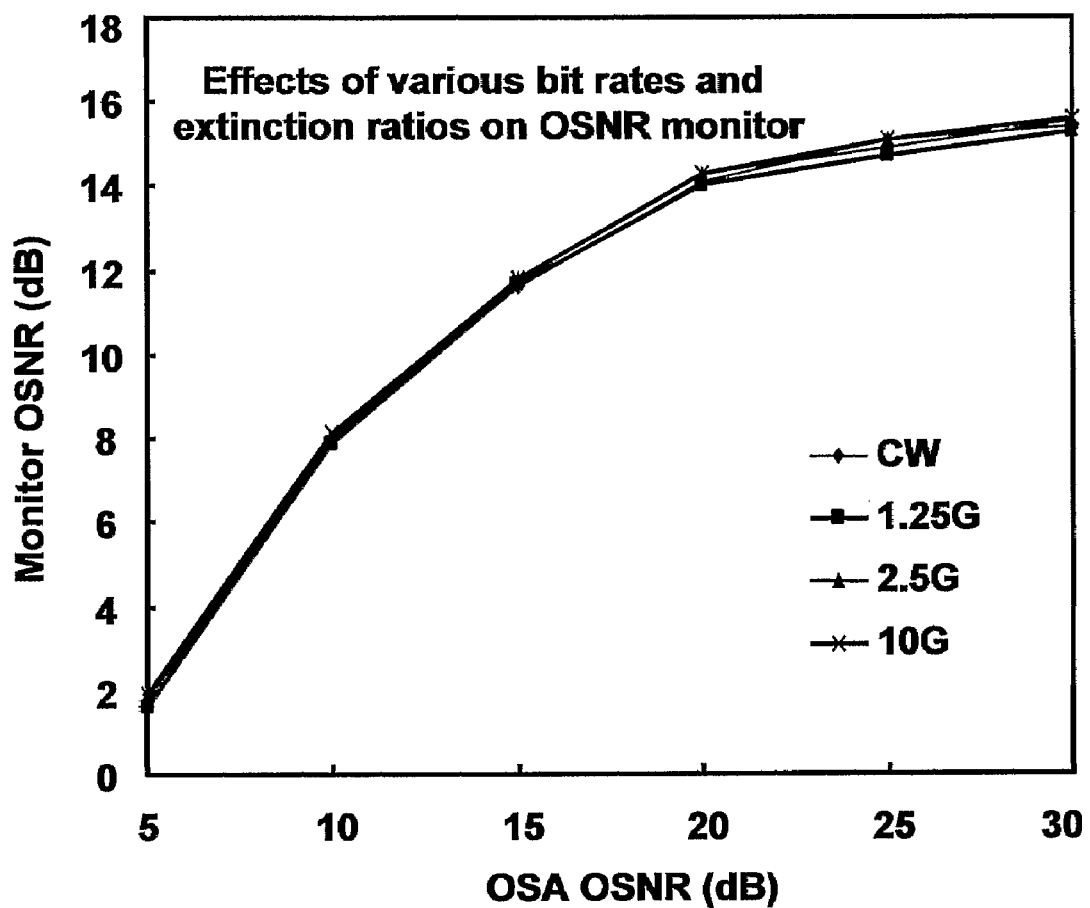
FIG. 13 is a chart of SNR measurements versus input OSNR measurements for a variety of bit rates using the experimental set up of FIG. 12.
Figure 14:
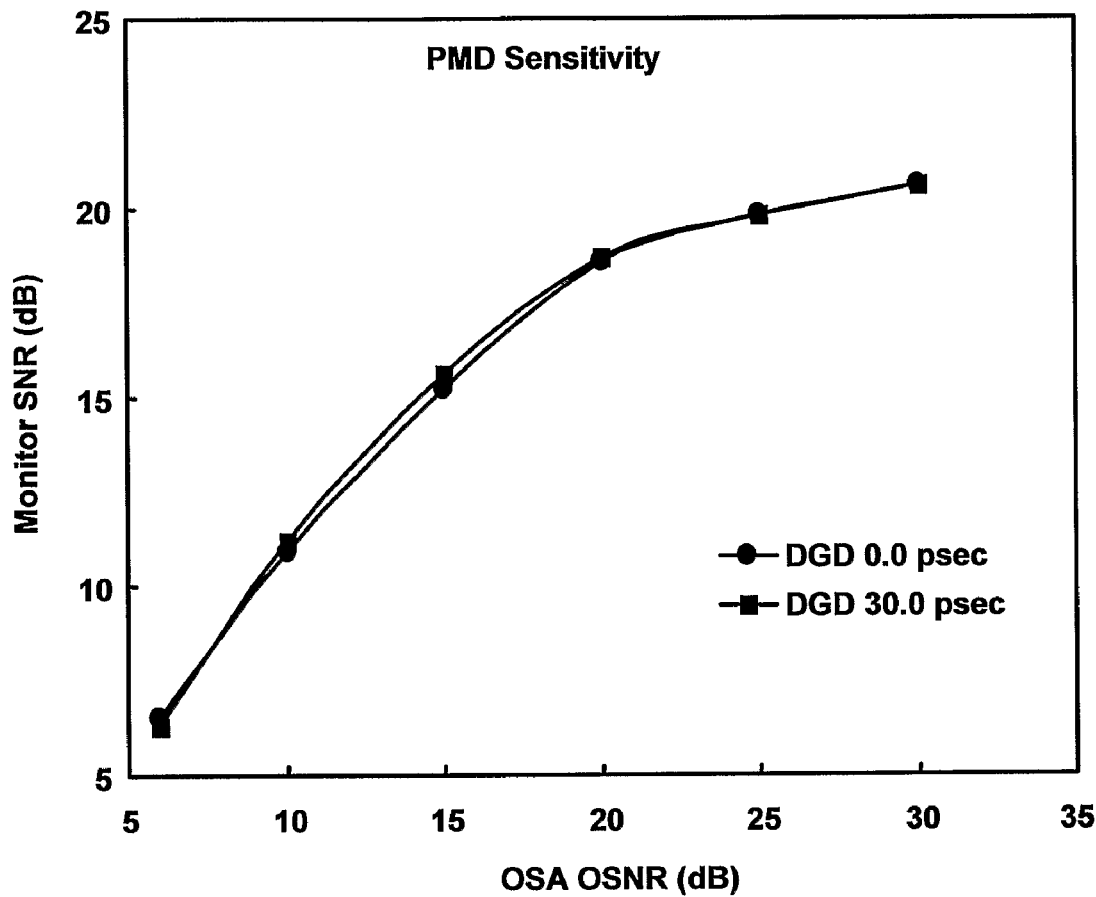
FIG. 14 is a chart of SNR measurements versus input OSNR measurements showing the insensitivity to $1^{st}$ order PMD.

The bit rate independent calibration curves in FIG. 13 demonstrates the bit rate independence of the monitor. In addition the calibration curves in FIG. 14 demonstrate the robustness of the monitor with respect to path length differences and first order PMD.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of determining in-band noise of an optical signal, the method comprising:

splitting the optical signal to produce a first optical signal component and a second optical signal component of distinct polarisation to the first optical signal component;

converting the first optical signal component to the electrical domain to produce a first electrical signal component;

converting the second optical signal component to the electrical domain to produce a second electrical signal component;

equalising a signal power of the first electrical signal component and a signal power of the second electrical signal component; and subtracting the equalised first electrical signal component and second electrical signal component.

2. The method of claim 1 wherein the second optical signal component is of sufficiently distinct polarisation to the first optical signal component that the noise to be measured in the second optical signal component is substantially uncorrelated with the noise to be measured in the first optical signal component.

3. The method of claim 1, further comprising direct in-band measurement of the result of the subtracting.

4. The method of claim 1 wherein the equalising comprises passing at least one of the first optical signal component and the second optical signal component through a respective variable optical attenuator prior to conversion to the electrical domain.

5. The method of claim 4 further comprising controlling the or each respective variable optical attenuator by feedback from the electrical domain.

6. The method of claim 1 wherein the equalising comprises passing the optical signal through a polarisation controller configured at substantially 45° to the input of a polarisation beam splitter such that, upon splitting, substantially equal signal power is carried by the first optical signal component and the second optical signal component.

7. The method of claim 1 wherein the equalising comprises monitoring the signal power of the first and second electrical signal components, and waiting for polarisation changes in the optical signal to cause equalisation from time to time.

8. The method of claim 1 further comprising passing the optical signal through a rotating quarter wave plate prior to splitting.

9. The method of claim 1 wherein the equalising comprises electrical domain signal processing of at least one of the first electrical signal component and the second electrical signal component, prior to subtraction of the first electrical signal component and the second electrical signal component.

10. The method of claim 1 wherein the equalising comprises:

splitting the second optical signal component to obtain a third optical signal component and a fourth optical signal component having a polarisation at substantially 45 degrees to the third optical signal component;

converting the third optical signal component to the electrical domain to obtain a third electrical signal component;

converting the fourth optical signal component to the electrical domain to obtain a fourth electrical signal component; and selecting at least one of the third electrical signal component and the fourth electrical signal component to serve as the second electrical signal component for subtraction with the first electrical signal component.

11. The method of claim 1, wherein the equalising comprises depolarising the optical signal prior to splitting the optical signal.

12. The method of claim 1, wherein the first optical signal component and the second optical signal component undergo distinct delays, such that the output of the subtractive combination of the first electrical signal and the second electrical signal is substantially noise only at particular frequencies defined by the delay difference.

13. A device for determining in-band noise of an optical signal, the device comprising:

a splitter for splitting the optical signal to produce a first optical signal component and a second optical signal component of distinct polarisation to the first optical signal component;

a first photodetector for converting the first optical signal component to the electrical domain to produce a first electrical signal component;

a second photodetector for converting the second optical signal component to the electrical domain to produce a second electrical signal component;

means for equalising a signal power of the first electrical signal component and a signal power of the second electrical signal component; and a combiner for subtracting the equalised first electrical signal component and second electrical signal component.

14. The device of claim 13 wherein the splitter is a polarisation beam splitter.

15. The device of claim 14 further comprising a polarisation controller configured at substantially 45° to the input of the splitter such that, upon splitting, substantially equal signal power is carried by the first optical signal component and the second optical signal component.

16. The device of claim 13 wherein the splitter is a power splitter, and wherein the device further comprises at least one polariser to produce the distinct polarisation between the first optical signal component and the second optical signal component.

17. The device of claim 13, further comprising an OSNR meter for direct in-band measurement of the output of the combiner.

18. The device of claim 13 further comprising at least one variable optical attenuator for variably attenuating at least one of the first optical signal component and the second optical signal component for equalising the first optical signal component and the second optical signal component prior to conversion to the electrical domain.

19. The device of claim 18 further comprising a feedback circuit from the electrical domain for controlling the or each respective variable optical attenuator.

20. The device of claim 13 further comprising a rotating quarter wave plate through which the optical signal is passed prior to splitting.

21. The device of claim 13 further comprising an electrical domain signal processor for at least one of the first electrical signal component and the second electrical signal component, to equalise the first electrical signal component and the second electrical signal component prior to subtraction of the first electrical signal component and the second electrical signal component.

22. The device of claim 13 further comprising:
a splitter for splitting the second optical signal component to obtain a third optical signal component and a fourth optical signal component having a polarisation at substantially 45 degrees to the third optical signal component;
a third photodetector for converting the third optical signal component to the electrical domain to obtain a third electrical signal component;
a fourth photodetector for converting the fourth optical signal component to the electrical domain to obtain a fourth electrical signal component; and
a processor to select at least one of the third electrical signal component and the fourth electrical signal component to serve as the second electrical signal component for subtraction with the first electrical signal component.

23. The device of claim 13, further comprising a depolariser to depolarise the optical signal prior to splitting.

24. The device of claim 13, wherein the first optical signal component and the second optical signal component undergo distinct delays, such that the output of the subtractive combination of the first electrical signal and the second electrical signal is substantially noise only at particular frequencies defined by the delay difference.

\* \* \* \* \*